UNITED STATES PATENT OFFICE.

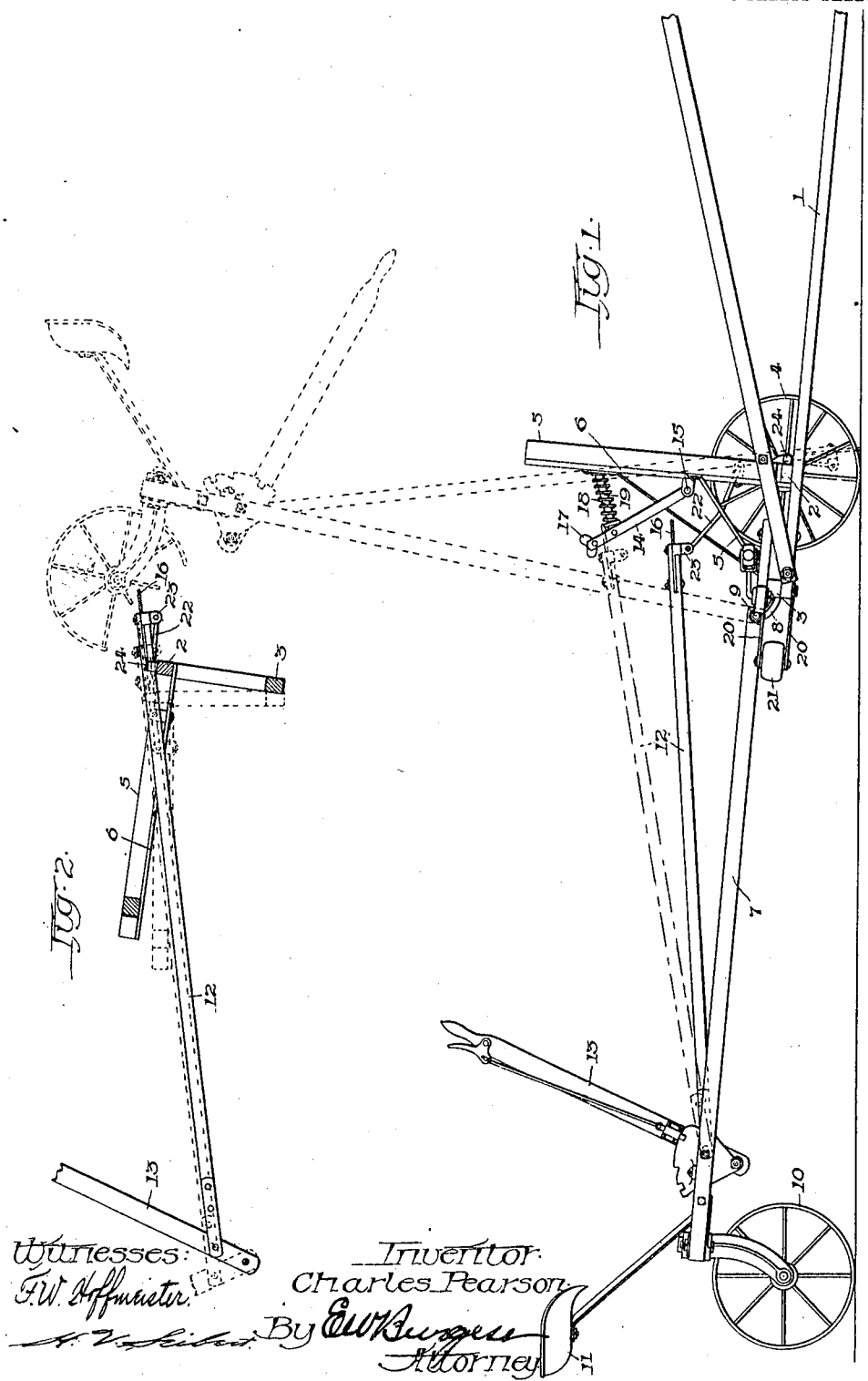

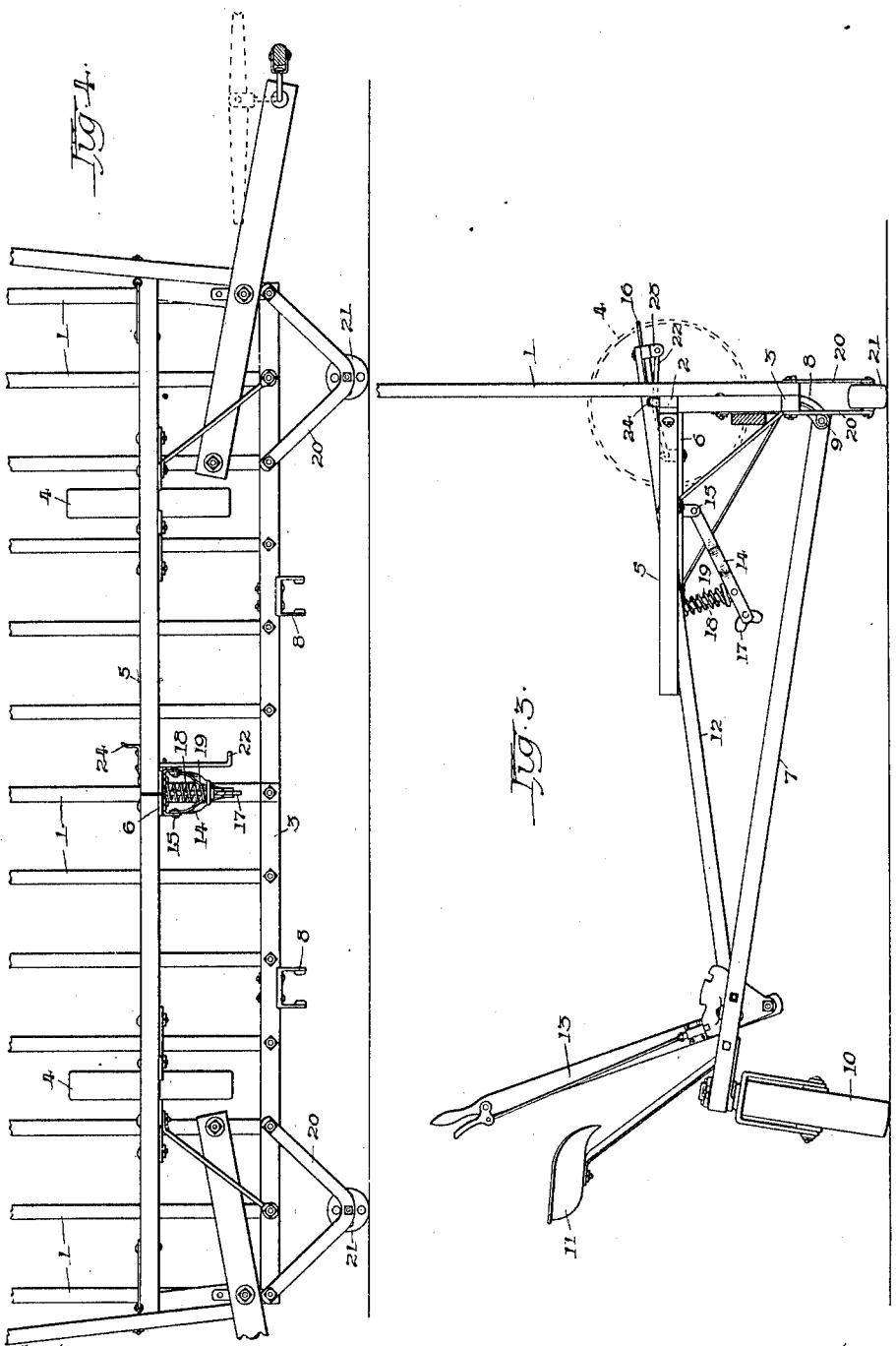

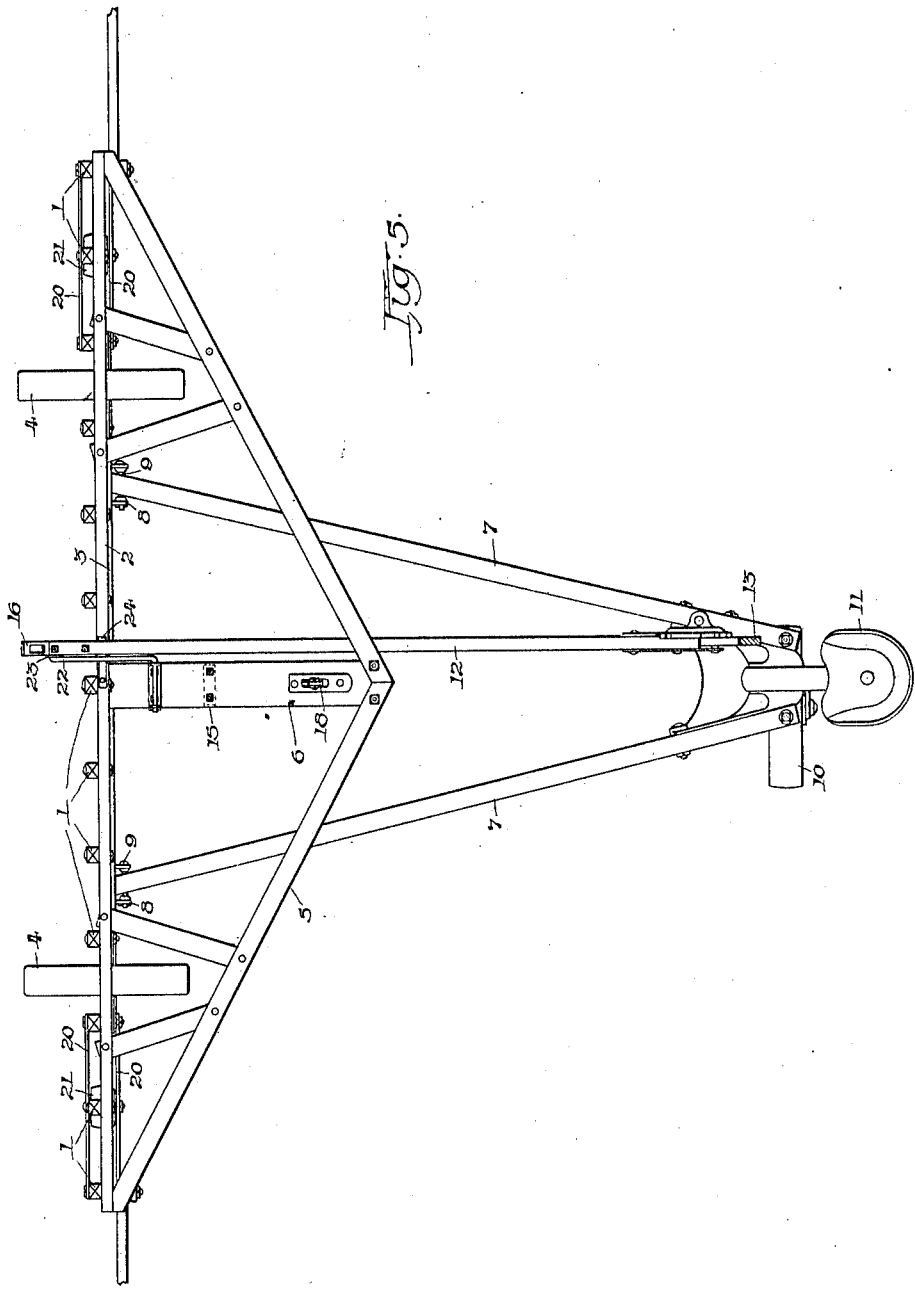

CHARLES PEARSON, OF CHICAGO, ILLINOIS, ASSIGNOR TO INTERNATIONAL HARVESTER COMPANY, A CORPORATION OF NEW JERSEY.

SWEEP-RAKE.

989,036.  Specification of Letters Patent.  Patented Apr. 11, 1911.

Application filed July 14, 1910. Serial No. 571,896.

*To all whom it may concern:*

Be it known that I, CHARLES PEARSON, a citizen of the United States, residing at Chicago, in the county of Cook and State of Illinois, have invented certain new and useful Improvements in Sweep-Rakes, of which the following is a specification.

My invention relates to sweep rakes, and in particular to the mechanism whereby the tooth carrying frame may be raised to a vertical position relative to the trailing frame for transportation or other purposes; its object being to provide a mechanism that may be readily and quickly manipulated for the required purpose. I attain this object by means of the mechanism illustrated in the accompanying drawings, in which—

Figure 1 represents a side elevation of a sweep rake having my invention forming a part thereof; Fig. 2 is a detached detail, partly in section, of a portion of the folding mechanism; Fig. 3 is a side elevation of my improved sweep rake shown in folded position; Fig. 4 is a rear elevation of a part of Fig. 3; and Fig. 5 is a top plan view of Fig. 3.

The same reference characters designate like parts throughout the several views.

1 represents rake teeth having their rear ends secured to front and rear cross bars 2 and 3, respectively; 4 the rake carrying wheels; 5 a truss frame including right and left-hand truss bars arranged transversely across the rear end of the rake frame and inclining forward and upward have their inner and upper ends connected with a strut member 6 in a common way.

7 represents rearwardly converging bars having their forward ends pivotally connected with the rake frame by means of stirrup brackets 8 and pins 9, the rear ends of the bars being supported upon a caster wheel 10 and carrying an operator's seat 11, the whole constituting a trailing frame, from which the movement of the rake may be controlled by means of a rake controlling bar 12, having its rear end pivotally connected with a hand lever 13 and its forward end yieldingly connected with the strut member 6 by means of a swinging bar 14, having its lower end pivotally connected with the strut member at 15, the forward end of the controlling bar being provided with a plate member 16 having an opening therein adapted to receive the upper end of bar 14, and 17 represents a retaining button pivotally connected with the upper end of the bar 14 and operative to prevent accidental disengagement of the controlling bar.

18 represents a link having its rear end pivotally connected with bar 14 and its forward end slidably received by an opening in the strut, and 19 is a compression spring surrounding the link and operative between the strut and bar in a manner to yieldingly resist a forward movement of the controlling bar.

The folding mechanism includes bracket members 20, secured to the rear side of the rake frame at opposite ends thereof, that project rearward when the rake is in operative position, and 21 represent wheels journaled in the brackets. 22 represents a swinging link having oppositely disposed laterally turned arms at opposite ends thereof, one of said arms being pivotally connected with the strut member 6 and the other adapted to receive a pendent ear portion 23 secured to the forward end of the rake controlling bar 12. When it is desired to fold the rake for transportation or other purposes, the forward end of the rake controlling bar is removed from the end of the swinging bar 14 and connected with an arm of link 22, and the trailing frame may then be raised to a vertical position as shown by dotted lines in Fig. 1, the link 22 swung forward and downward until the controlling bar contacts with the front cross bar 2 of the rake frame, where it is held from lateral displacement by means of locking member 24 secured to the cross bar 2, and when in this position the relative position of the pivotal axis of link 22 is such that the mechanism is self-locked against accidental disengagement, as shown in Fig. 2.

What I claim as my invention, and desire to secure by Letters Patent, is:

1. A sweep rake including, in combination, a tooth supporting frame, a trailing frame having its forward end pivotally connected with the rear side of said tooth supporting frame, a hand lever mounted upon said trailing frame, a rake controlling bar having its rear end pivotally connected with said hand lever and its forward end releasably connected with said tooth supporting frame, a swinging link having one end pivotally connected with said tooth supporting frame in a manner permitting said link to swing in a fore and aft direction, the forward end of said rake controlling bar having means whereby it may be pivotally connected with the opposite end of said swinging link in a manner permitting the tooth supporting frame to be swung about its pivotal connection with said trailing frame to a substantially vertical position relative thereto.

2. A sweep rake including, in combination, a tooth supporting frame, a traveling frame having its forward end pivotally connected with the rear side of said tooth supporting frame, a hand lever mounted upon said trailing frame, a rake controlling bar having its rear end pivotally connected with said hand lever and its forward end releasably connected with said tooth supporting frame, a swinging link pivotally connected with said tooth supporting frame in a manner permitting said link to swing in a fore and aft direction, the forward end of said rake controlling bar having means whereby it may be pivotally connected with said swinging link in a manner permitting the tooth supporting frame to be swung to a substantially vertical position relative to said trailing frame, and carrying wheels journaled upon said tooth supporting frame and operative to sustain its weight when it is in a folded position.

3. A sweep rake including, in combination, a tooth supporting frame, a trailing frame having its forward end pivotally connected with the rear side of said tooth supporting frame, a hand lever mounted upon said trailing frame, a rake controlling bar having its rear end pivotally connected with said hand lever, a swinging bar having one end pivotally connected with a fixed part of said tooth supporting frame, the forward end of said rake controlling bar being adapted to be releasably connected with the opposite end of said swinging bar, said swinging bar being yieldingly held against movement in one direction relative to said tooth supporting frame, a swinging link having one end pivotally connected with said tooth supporting frame in a manner permitting said link to swing in a fore and aft direction, the forward end of said rake controlling bar having means whereby it may be pivotally connected with the opposite end of said link in a manner permitting the tooth supporting frame to be swung to a substantially vertical position relative to the trailing frame.

4. A sweep rake including, in combination, a tooth supporting frame, a trailing frame having its forward end pivotally connected with the rear side of said tooth supporting frame, a hand lever mounted upon said trailing frame, a rake controlling bar having its rear end pivotally connected with said hand lever, a swinging bar having one end pivotally connected with a fixed part of said tooth supporting frame, the forward end of said rake controlling bar being adapted to be releasably connected with the opposite end of said swinging bar, a link having one end pivotally connected with said swinging bar and its opposite end slidably received by a fixed part of said tooth supporting frame, a compression spring surrounding said link and operative between the bar and frame in a manner to yieldingly press said link in a direction to resist a forward movement of said rake controlling bar.

5. A sweep rake including, in combination, a tooth supporting frame, a trailing frame having its forward end pivotally connected with the rear side of said tooth supporting frame and its rear end supported upon a caster wheel, a hand lever mounted upon said trailing frame, a rake controlling bar having its rear end pivotally connected with said hand lever and its forward end releasably connected with said tooth supporting frame, a swinging link having one end pivotally connected with said tooth supporting frame in a manner permitting said link to swing in a fore and aft direction, the forward end of said rake controlling bar having means whereby it may be pivotally connected with the opposite end of said swinging link in a manner permitting the tooth supporting frame to be swung about its pivotal connection with said trailing frame to a substantially vertical position relative thereto, the swinging link moving to a self-locking position when the tooth supporting frame is in a vertical position.

CHARLES PEARSON.

Witnesses:
 FRANK A. ZABILKA,
 RAY PATTISON.